US 6,583,998 B2

(12) United States Patent
Chiu

(10) Patent No.: US 6,583,998 B2
(45) Date of Patent: Jun. 24, 2003

(54) POWER SUPPLY REGULATING HAVING NOVEL CHARGING CIRCUITRY

(75) Inventor: Sean S. Chiu, Marlborough, MA (US)

(73) Assignee: Bose Corporation, Framingham, MA (US)

(*) Notice: Subject to any disclaimer, the term of this patent is extended or adjusted under 35 U.S.C. 154(b) by 0 days.

(21) Appl. No.: 09/954,740

(22) Filed: Sep. 17, 2001

(65) Prior Publication Data
US 2003/0053322 A1 Mar. 20, 2003

(51) Int. Cl.⁷ .............................. H02M 5/42; H02J 7/06
(52) U.S. Cl. .................... 363/89; 363/126; 320/164
(58) Field of Search ...................... 363/89, 84, 81, 363/125, 126; 320/148, 164

(56) References Cited

U.S. PATENT DOCUMENTS

| 3,646,423 | A | * | 2/1972 | Tatematsu et al. | |
| 3,953,783 | A | * | 4/1976 | Peters, Jr. | |
| 4,641,233 | A | | 2/1987 | Roy | 363/89 |
| 4,659,894 | A | * | 4/1987 | Inoue | 219/69 P |
| 5,304,917 | A | * | 4/1994 | Somerville | |
| 5,469,046 | A | | 11/1995 | Wong et al. | 323/286 |
| 5,502,628 | A | * | 3/1996 | Arakawa | 363/20 |
| 5,687,065 | A | | 11/1997 | Majid | 363/89 |
| 5,708,577 | A | * | 1/1998 | McKinley | 363/89 |
| 5,801,933 | A | * | 9/1998 | Ravid | 363/89 |
| 6,018,467 | A | | 1/2000 | Majid et al. | 363/16 |
| 6,426,628 | B1 | * | 7/2002 | Palm et al. | 324/427 |

* cited by examiner

Primary Examiner—Adolf Deneke Berhane
(74) Attorney, Agent, or Firm—Fish & Richardson P.C.

(57) ABSTRACT

A power supply constructed and arranged so that the power supply is charged during an interval during the rising edge and during an interval during the falling edge, and so that the charging circuitry does not charge the capacitor at the peak of the AC cycle.

10 Claims, 4 Drawing Sheets

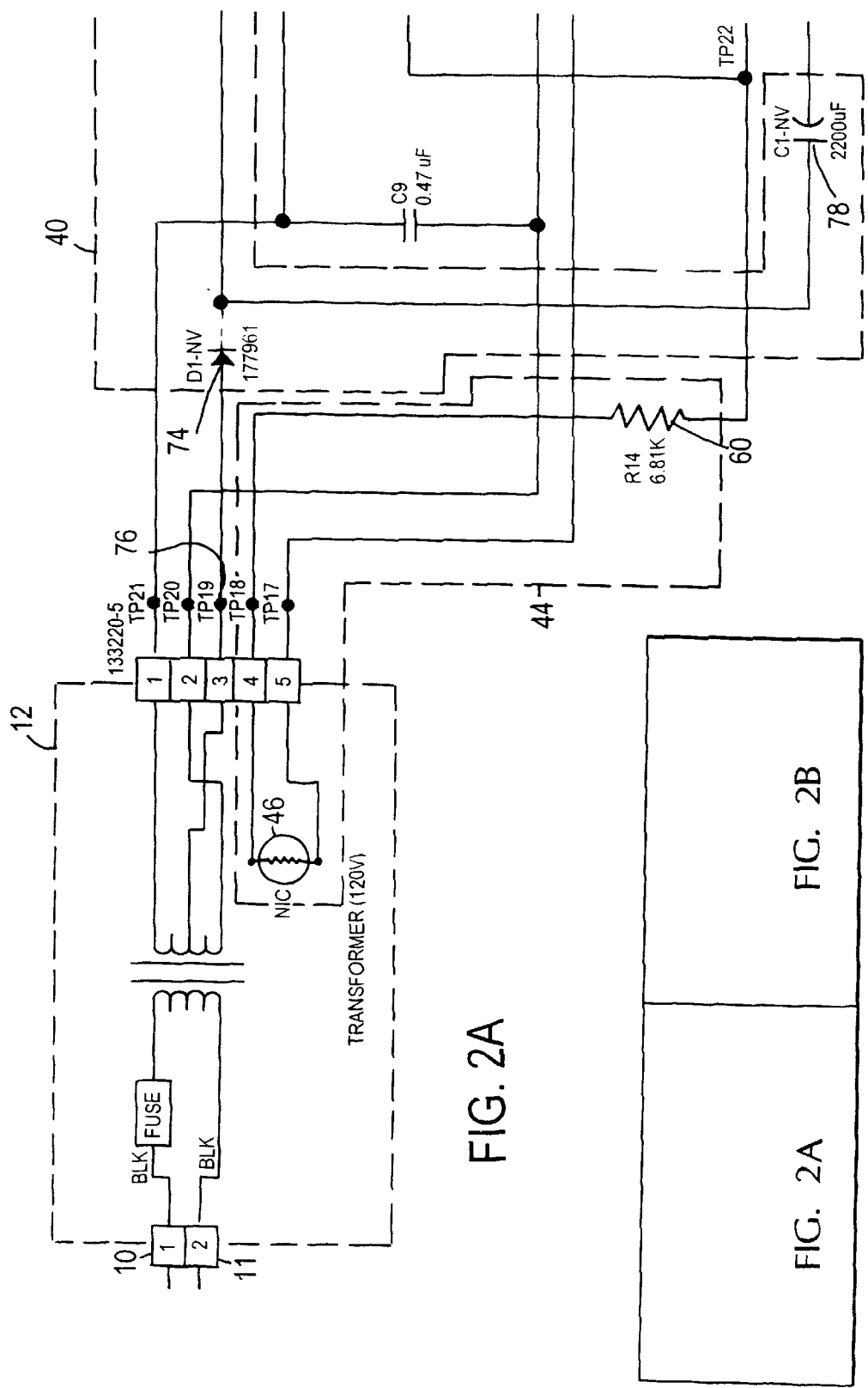

US 6,583,998 B2

POWER SUPPLY REGULATING HAVING NOVEL CHARGING CIRCUITRY

STATEMENT REGARDING FEDERALLY SPONSORED RESEARCH OR DEVELOPMENT

This invention involves no federally sponsored research or development.

TECHNICAL FIELD

This invention relates to regulated power supplies.

BACKGROUND OF THE INVENTION

It is an important object of the invention to provide a high power partially regulated power supply using line frequency switching circuitry and having low switching loss and thermal protection.

BRIEF SUMMARY OF THE INVENTION

According to the invention, a power supply includes a capacitor, having a first terminal and a second terminal, for storing DC charge. The power supply also includes first and second line input terminals for connecting to a source of AC line current, the AC line current having an AC line voltage, a transformer, coupled to the first and second line input terminals, for transforming the AC line voltage to a reduced AC voltage, a rectifier, coupled to the transformer, for rectifying the reduced AC voltage to rectified AC, the rectified AC having a voltage waveform having a rising edge, a falling edge, and a peak. The power supply also includes charging circuitry, coupling the rectifier and the capacitor, for charging the capacitor to a nominal DC output voltage. The power supply is constructed and arranged so that the charging circuitry charges the capacitor during an interval during the rising edge and during an interval during the falling edge, and so that the charging circuitry does not charge the capacitor at the peak.

In another aspect of the invention, a power supply includes a first, second, and third output terminal and first and second line input terminals for connecting to a source of AC line current, the AC line current having an AC line voltage. The power supply further includes a transformer, coupled to the first and second line input terminals, for transforming the AC line voltage to a reduced AC voltage; a rectifier, coupled to the transformer, for rectifying the reduced AC voltage to rectified AC; and charging circuitry, for charging the first, second, and third output terminals to a first, second, and third electrical potential, respectively, so a potential difference between the first potential and the second potential is less than a potential difference between the first potential and the third potential. The charging circuitry includes a single switch.

In still another aspect of the invention, a power supply includes a capacitor, having a first terminal and a second terminal, for storing DC charge. The power supply also includes first and second line input terminals for connecting to a source of AC line current, the AC line current having an AC line voltage, a transformer, coupled to the first and second line input terminals, for transforming the AC line voltage to a reduced AC voltage, a rectifier, coupled to the transformer, for rectifying the reduced AC voltage to rectified AC, the rectified AC having a voltage waveform having a rising edge, a falling edge, and a peak. The power supply also includes charging circuitry, coupling the rectifier and the capacitor, for charging the capacitor to a nominal DC output voltage. The power supply is constructed and arranged so that the charging circuitry charges the capacitor twice during each rectified AC cycle.

Other features, objects, and advantages will become apparent from the following detailed description, which refers to the accompanying drawing in which:

DETAILED DESCRIPTION

Figure 1:
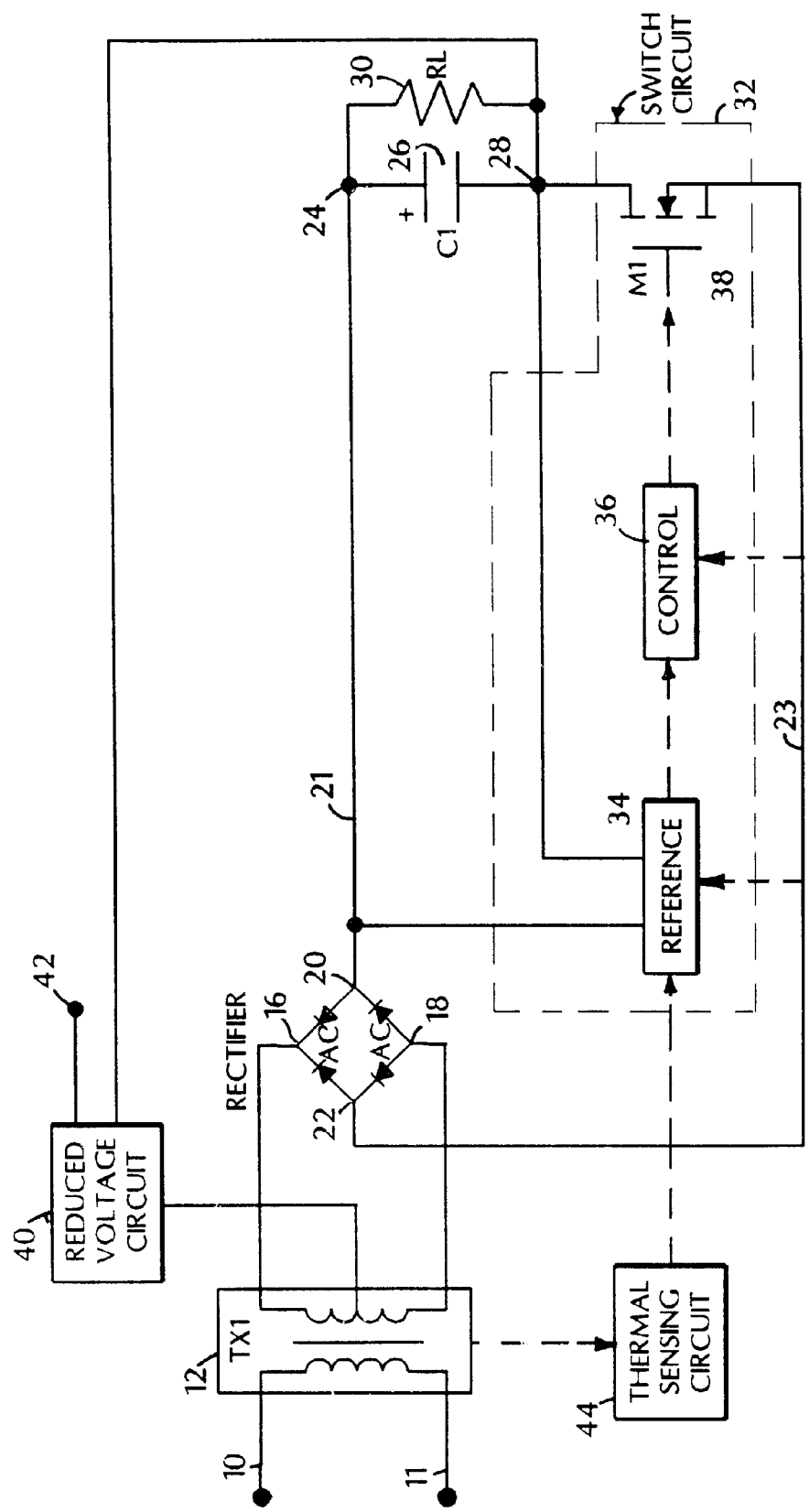
FIG. 1 is a block diagram of a power supply according to the invention.
Figure 2B:
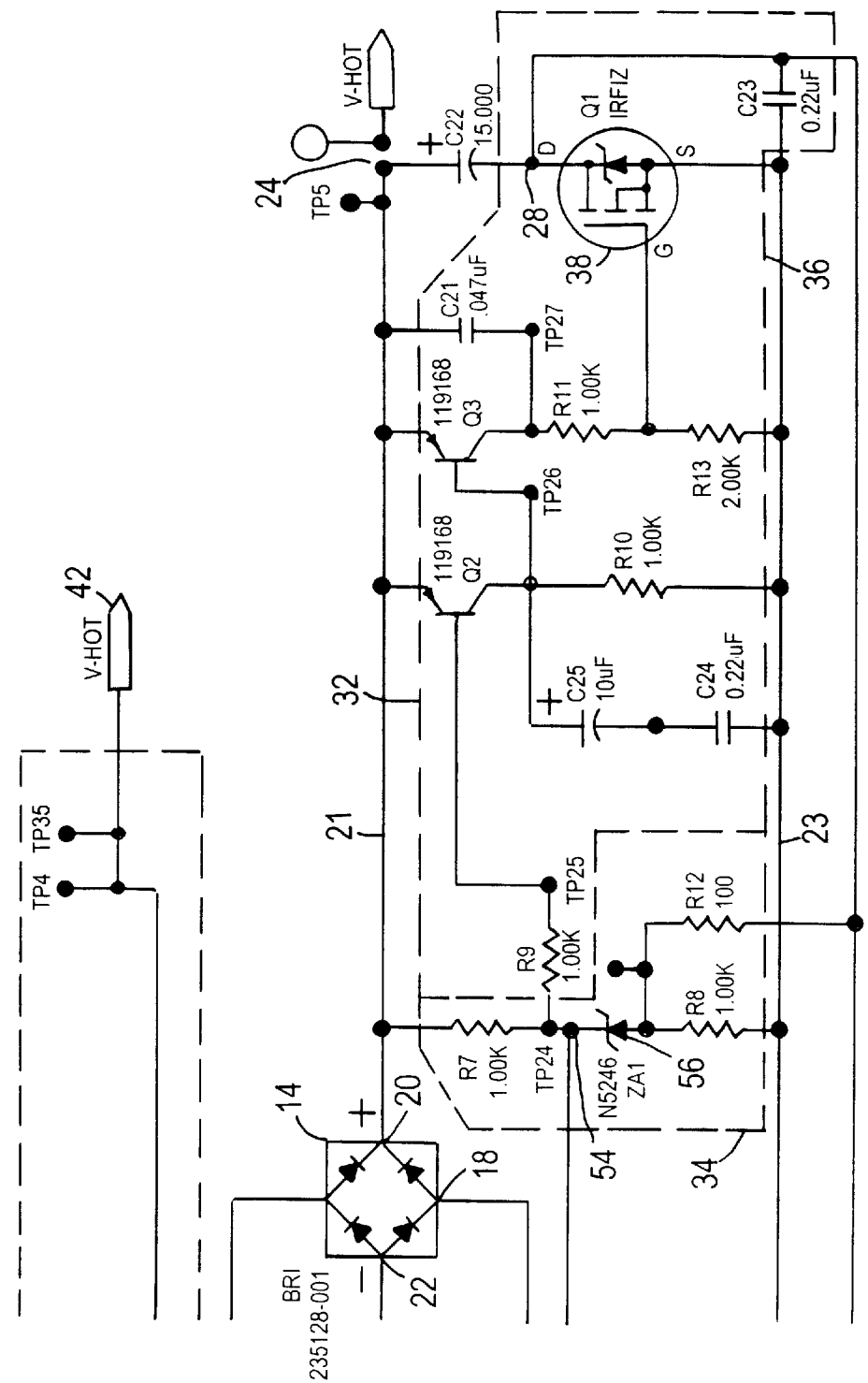
FIG. 2 is a schematic diagram of a power supply according to FIG. 1.

With reference now to the drawing and more particularly to FIG. 1, there is shown a block diagram of the logical arrangement of a power supply according to the invention. The lines connecting the elements are shown as solid or dashed. Solid lines represent interconnection between elements for transmitting electrical power. Dashed lines connecting elements represent interconnection between elements for the transmitting information or control; the arrows on the dashed lines represent the direction of the flow of information or control. For the sake of clarity, interconnections for powering or grounding circuit devices are not shown in this view, but are shown in FIG. 2. A power supply includes power supply input terminals 10, 11, for connecting to an external AC power source, such as 120V 60 Hz line power. Power supply input terminals 10, 11, are connected to primary winding of transformer 12. Secondary windings of transformer 12 are coupled to rectifier 14 through rectifier input terminals 16, 18. Rectifier positive output terminal 20 is coupled by high side power line 21 to terminal 24 of load capacitor 26. Load resistor $R_L$ 30 is coupled in parallel with capacitor 26 at terminals 24 and 28. Rectifier negative terminal 22 is coupled to terminal 28 of capacitor 26 and load resistor $R_L$ 30 through switch circuit 32. Switch circuit 32 includes reference block 34, control block 36, and switch 38. Inputs of reduced voltage circuit 40 are coupled to an intermediate voltage tap of transformer 12 and terminal 28 of load capacitor 26. Reference block 34 receives signals from high side power line 21, low side power line 23, terminal 28 of load capacitor 26, and thermal sensing circuit 44. Reference block 34 transmits signals to control block 36, which controls switch 38.

A power supply according to the invention having a switch on the low side power line is advantageous over power supplies having switches on the high side power line because there is less switching loss (dissipated as heat) when the switch is on the low side power line.

In operation, transformer 12 converts the input voltage from line AC voltage level (e.g. 120V. 60 Hz) to an intermediate AC voltage level (such as 17V. 60 Hz). Rectifier 14 rectifies the intermediate voltage AC to rectified AC voltage, which is then used to charge capacitor 26, which maintains a DC voltage across load, represented by load resistor $R_L$ 30. Switch circuit 32 controls the charging of capacitor 26 as described below.

Transformer 12, rectifier 14, and capacitor 26 are conventional elements. Switch 38 may be a conventional n-type MOSFET switch. Load represented by load resistor $R_L$ 30 is typically a circuit requiring DC power, such as audio signal processing circuitry and a power amplifier.

Referring now to FIG. 2, there is shown a circuit for implementing the power supply of FIG. 1. Like reference numbers in FIG. 2 refer to corresponding elements of FIG. 1. Dashed line boxes in FIG. 2 enclose the portions of the circuit that perform the functions represented by the blocks of FIG. 1.

Figure 3:
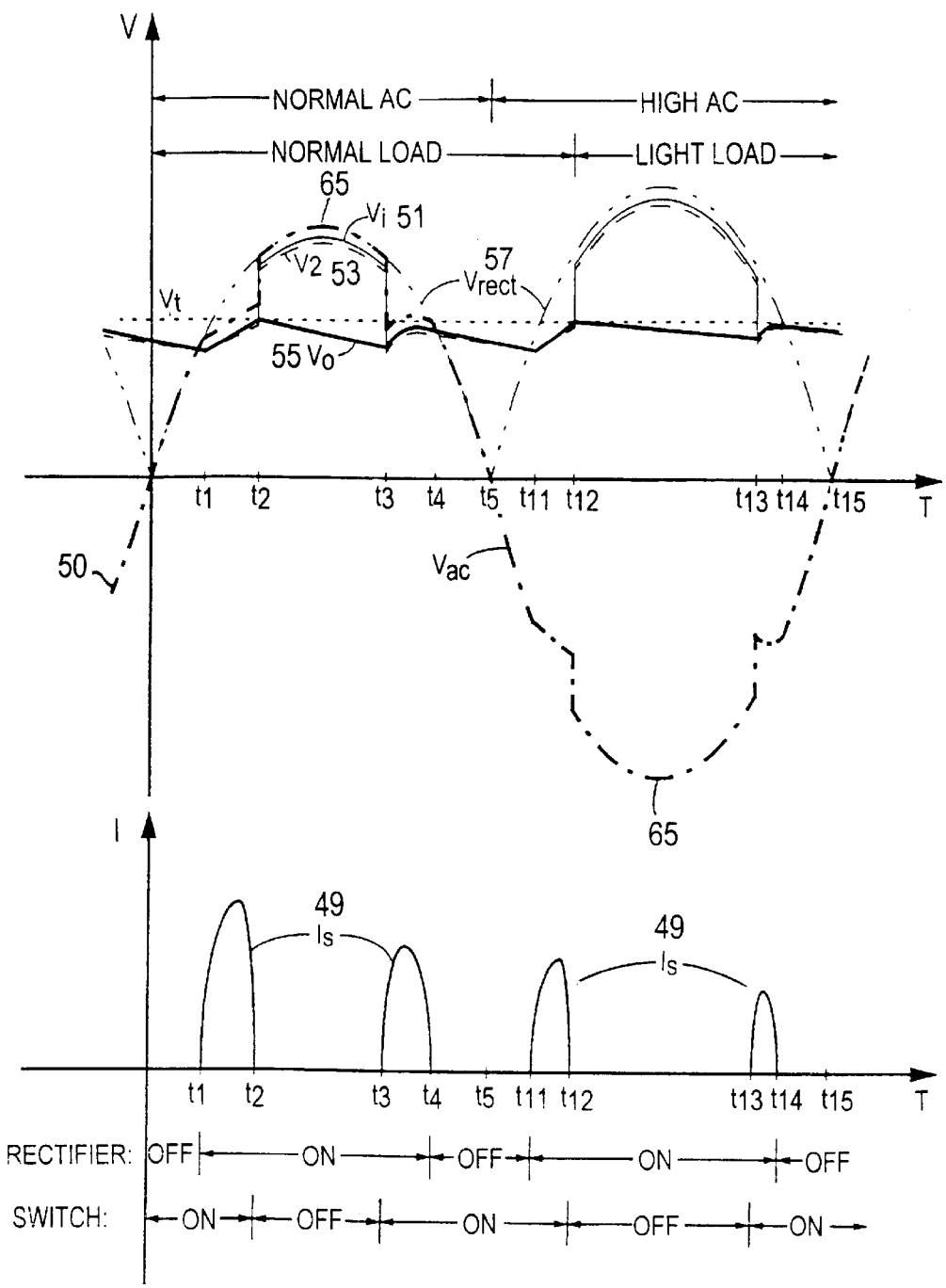
FIG. 3 shows waveforms and other electrical parameters, illustrating the operation of the power supply of FIGS. 1 and 2.

Referring now to FIG. 3, there is shown a plot of voltages and charging current for the purpose of illustrating the operation of the power supply of FIGS. 1 and 2. Curve 50 is a plot of voltage $V_{ac}$, the voltage across the input lines to rectifier terminals 16, 18. The perturbations in curve 50 are due to the load when the power supply is charging. Curve 51 is a plot of $V_i$, the voltage across the output terminals 20, 22 of the rectifier. Curve 53 is a plot of $V_z$, the voltage between nodes 54 and 22. Curve 57, for reference, is a waveform of the rectified value of $V_{ac}$, if it were operating without a load. Curve 55 is a plot of $V_o$, the voltage across terminals 24, 28 of load capacitor 26. Curve 55 has an upward slope when load capacitor 26 is being charged and a downward slope when capacitor 26 discharges through load resistor 30. Curve 49 is a plot of $I_s$, the charging current, illustrating when capacitor 26 is being charged. The curves have been smoothed, that is minor perturbations and voltage spikes due to switching are not shown.

Load capacitor is being charged when switch 38 is in the ON position and when rectifier 14 is ON (that is, when the voltage across input terminals 16, 18 is less than the voltage across the rectifier output terminals 20, 22, causing current to flow through rectifier 14).

The operation of switch 38 is understood by reference to curves 51 and 53. Switch is initially ON at time $t_0$. At time $t_2$, switch 38 turns OFF when $V_i$ is equal to $V_t$. Switch 38 turns ON at time $t_3$ on the falling edge of the cycle, when $V_z$ is greater than $V_t$ by an amount $V_z$, which is determined by the characteristics of transformer 12 and the ratio of resistors 70 and 72. Switch 38 remains ON through time $t_5$, which is essentially equivalent to time $t_0$. Switch 38 turns OFF at time $t_{12}$ on the following half cycle, essentially similar to the situation at time $t_2$, and turns ON at time $t_{13}$, which is essentially similar to the situation at time $t_{14}$. Rectifier 14 turns ON at time $t_1$, when $V_i$ becomes greater than $V_o$. Rectifier 14 turns OFF at time $t_4$, when $V_i$ becomes less than $V_o$. Rectifier 14 remains OFF through time $t_5$, which is essentially equivalent to time $t_0$. Rectifier 14 turns ON again at time $t_{11}$, which is essentially similar to the situation at time $t_1$. Rectifier 14 turns OFF at time $t_{14}$, which is essentially similar to the situation at time $t_4$.

Rectifier 14 and switch 38 are both ON during one interval ($t_1$ to $t_2$) on the rising edge of the first half cycle and during one interval ($t_3$ to $t_4$) on the falling edge of the first half cycle. Similarly, rectifier 14 and switch 38 are both ON during one interval ($t_{11}$ to $t_{12}$) on the rising edge of the second half cycle and during one interval ($t_{13}$ to $t_{14}$) on the falling edge of the second half cycle. Thus, the power supply is being charged during one interval on the rising edge of the half cycle and during one interval on the falling edge of the half cycle. The power supply is not being charged during the interval that includes the peak 65 of the half cycle. The length of the charging intervals ($t_1$ to $t_2$), ($t_3$ to $t_4$), ($t_{11}$ to $t_{12}$), ($t_{13}$ to $t_{14}$) is determined by a number of factors, including the shape of the input waveform (which may not be purely sinusoidal if the power line is loaded with a large number of devices that draw power near the peak of the AC cycle), the load on the power supply, and characteristics of transformer 12 and the ratio of the two resistors 70 and 72 of FIG. 2. The power supply operates as described over a wide range of typical conditions, including variations in $V_{ac}$ and load. The interval $t_5$ to $t_{15}$ shows that the power supply according to the invention maintains a maximum voltage at $V_t$ even with a high AC voltage and a light load.

A power supply according to the invention generally is subject to less agency regulation (such as EMC standard EN61000, which has a special class for power supplies such as the present one, which require less or no line conditioning devices for power factor correction). Furthermore, a power supply according to the invention can pass easily many EMI standards such as FCC and line conducted emissions) because of the lack of high frequency switching.

Additionally, a power supply that does not charge at the peak is advantageous because the output voltage has a fixed maximum which does not change, even though the line voltage varies, as long as the peak of $V_{ac}$ is greater than $V_t$.

A power supply that charges twice (or more) during each half line AC cycle or four times (or more) during each full line AC cycle maintains a voltage close to the intended output voltage under heavy load conditions than does a power supply that charges only once per half cycle or twice per full cycle. The falling edge charging generates less switch heating than rising edge charging, so the inclusion of falling edge charging means less overall switch heating for the same load.

Referring again to FIG. 2, reduced voltage circuit 40 of FIG. 1 is implemented as a diode 74 coupled to an intermediate voltage tap of transformer, capacitor 76, reduced voltage terminal 42, and to capacitor terminal 28 through capacitor 28. Voltage at terminal 42 may be used to power devices having voltage requirements less than the devices represented by the resistor $R_L$ 30. If the intermediate voltage tap is a center tap, terminals 24, 42, and 28 can be configured as terminals with voltages at $$\frac{+V_o}{2},$$

ground, and $$\frac{-V_o}{2},$$

respectively. In such a configuration, a power supply according to the invention could be used to power bipolar devices A power supply according to the invention is advantageous over power supplies using duplicate functionally similar circuits to derive reduced voltage or bipolar voltages, because a power supply according to the invention requires fewer components, such as load capacitors, switches, and switch control circuits, reducing circuit cost. A power supply according to the invention requires less expensive components and can operate at higher power levels than power supplies providing reduced voltages using regulators.

Referring still to FIG. 2, thermal sensing circuit 44 of FIG. 1 is implemented as a negative temperature coefficient (NTC) resistor 46 embedded in transformer 12 and coupled to the reference circuit terminal node 54 and low side power line 23 by resistor 60. This NTC resistor and additional thermistors can be placed elsewhere in the circuit to protect other critically hot components.

In operation, when transformer 12 (or other protected component) overheats, the NTC resistor changes value, lowering $V_t$ and consequently $V_o$. With most resistive or amplifier loads, lowering $V_o$ results in lower current or power delivered to the output, thus lowering the stress on the transformer (or other protected component).

A power supply including a thermal sensing circuit 44 is advantageous over power supplies employing power fusing resistors because the power supply continues to operate (at reduced output) during overheating conditions rather than failing catastrophically. When the overheating condition no longer exists, the power supply resumes normal operation at full power. In most applications, especially high power applications, a power supply with a transformer is more efficient than a power supply with a power resistor as the voltage reducing element.

While the embodiments of FIGS. 1 and 2 employs a bridge rectifier 14, the invention may also be implemented in a power supply employing other forms of rectifiers, such as a diode rectifier or equivalent, and the circuit could be adapted to the rectifier employed. For example, a single diode rectifier could be used to provide half wave rectified AC. During each half wave, there would be charging during an interval during the rising edge and during an interval during the falling edge, and no charging at other parts of the waveform including the portion of the waveform between the rising edge charging and the falling edge charging.

It is evident that those skilled in the art may now make numerous uses of and departures from the specific apparatus and techniques disclosed herein without departing from the inventive concepts. Consequently, the invention is to be construed as embracing each and every novel feature and novel combination of features disclosed herein and limited only by the spirit and scope of the appended claims.

What is claimed is:

1. A power supply, comprising:
   a capacitor having a first terminal and a second terminal;
   first and second line input terminals for connecting to a source of AC line current;
   a transformer, coupled to said first and second line input terminals;
   a rectifier, coupled to said transformer, constructed and arranged to provide a voltage waveform having a rising edge, a falling edge, and a peak; and
   charging circuitry, coupling said rectifier and said capacitor, constructed and arranged for charging said capacitor to a nominal DC output voltage;
   wherein said power supply is constructed and arranged so that said charging circuitry charges said capacitor during an interval during said rising edge and during an interval during said falling edge, and so that said charging circuitry does not charge said capacitor at said peak.

2. A power supply in accordance with claim 1, further comprising
   a high side power line coupling said rectifier with said first capacitor terminal;
   a low side power line comprising a switch coupling said rectifier with said second capacitor terminal.

3. A power supply in accordance with claim 2, said power supply having an output terminal, said output terminal having an electrical potential less than the potential at said first capacitor terminal and greater than said potential at said second capacitor terminal.

4. A power supply in accordance with claim 3, wherein first capacitor terminal and said second capacitor terminal have a first electrical potential difference, and wherein said second capacitor terminal and said output terminal have a second electrical potential difference, wherein said second electrical potential difference is less than said first electrical potential difference.

5. A power supply in accordance with claim 4, wherein said second potential difference is half said first potential difference.

6. A power supply in accordance with claim 1, said power supply further comprising an overheating protection circuit, wherein said overheating protection circuit is constructed and arranged to respond to an overheating condition by causing said power supply to charge said capacitor to a non-zero voltage less than said nominal DC voltage.

7. A power supply in accordance with claim 6, wherein said overheating protection circuit comprises a negative temperature coefficient resistor in thermal contact with said transformer.

8. A power supply, comprising:
   first, second, and third output terminals;
   first and second line input terminals for connecting to a source of AC line current;
   a transformer, coupled to said first and second line input terminals;
   a rectifier, coupled to said transformer;
   charging circuitry, for charging said first, second, and third output terminals to first, second, and third electrical potentials respectively, so a potential difference between said first potential and said second potential is less than a potential difference between said first potential and said third potential, said charging circuitry comprising a single switch.

9. A power supply in accordance with claim 8, wherein said potential difference between said first potential and said second potential is half said potential difference between said first potential and said third potential.

10. A power supply, comprising:
    a capacitor having a first terminal and a second terminal;
    first and second line input terminals for connecting to a source of AC line current;
    a transformer, coupled to said first and second line input terminals;
    a rectifier, coupled to said transformer constructed and arranged to provide a voltage waveform having a rising edge, a falling edge, and a peak; and
    charging circuitry, coupling said rectifier and said capacitor, for charging said capacitor to a nominal DC output voltage;
    wherein said power supply is constructed and arranged to charge said capacitor twice during each cycle of said rectified AC.

* * * * *